US009191152B2

(12) United States Patent
Horiguchi

(10) Patent No.: US 9,191,152 B2
(45) Date of Patent: Nov. 17, 2015

(54) COMMUNICATION SYSTEM AND COMMUNICATION TERMINAL

(75) Inventor: Tomoya Horiguchi, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 190 days.

(21) Appl. No.: 13/421,216

(22) Filed: Mar. 15, 2012

(65) Prior Publication Data

US 2012/0202420 A1    Aug. 9, 2012

Related U.S. Application Data

(63) Continuation of application No. PCT/JP2010/003306, filed on May 17, 2010.

(51) Int. Cl.
*H04B 7/24* (2006.01)
*H04L 1/00* (2006.01)

(52) U.S. Cl.
CPC ............ *H04L 1/0041* (2013.01); *H04L 1/0045* (2013.01); *H04L 1/0075* (2013.01)

(58) Field of Classification Search
CPC .... H04L 1/0041; H04L 1/0045; H04L 1/0075
See application file for complete search history.

(56) References Cited

U.S. PATENT DOCUMENTS

| 2002/0080956 | A1* | 6/2002 | Lim | 379/398 |
| 2006/0183421 | A1* | 8/2006 | Proctor et al. | 455/11.1 |
| 2006/0221393 | A1* | 10/2006 | Takaki | 358/1.16 |
| 2008/0168320 | A1* | 7/2008 | Cassuto et al. | 714/746 |
| 2011/0182216 | A1* | 7/2011 | Ono et al. | 370/282 |
| 2011/0273999 | A1* | 11/2011 | Nagaraja | 370/252 |

FOREIGN PATENT DOCUMENTS

| JP | 01-209552 A | 8/1989 |
| JP | 2003-273840 A | 9/2003 |
| JP | 2006-217318 A | 8/2006 |
| JP | 2008-108356 A | 5/2008 |
| JP | 2008-300020 A | 12/2008 |

OTHER PUBLICATIONS

International Preliminary Report on Patentability (IPRP) and Written Opinion dated Dec. 10, 2012 (in English) in counterpart International Application No. PCT/JP2010/003306.
International Search Report dated Jul. 13, 2010 (in English) in counterpart International Application No. PCT/JP2010/003306.

* cited by examiner

*Primary Examiner* — Zhiyu Lu
(74) *Attorney, Agent, or Firm* — Holtz, Holtz, Goodman & Chick PC

(57) ABSTRACT

The present communication system has a communication terminal (100) and a communication terminal (200) that are respectively provided with a memory for writing and reading using error correction coding/decoding. The communication terminal (100) transmits data to the communication terminal (200) in a high speed mode or normal mode. In high speed mode, the communication terminal (100) reads coded data written in a first memory (112) and transmits the coded data to the communication terminal (200) without decoding. The receiving-side communication terminal (200) writes the received data in a second memory (212) without coding, and decodes the data when said data is read.

5 Claims, 12 Drawing Sheets

COMMUNICATION SYSTEM AND COMMUNICATION TERMINAL

CROSS-REFERENCE TO RELATED APPLICATIONS

This application is a Continuation application of PCT Application No. PCT/2010/003306, filed May 17, 2010, the entire contents of which are incorporated herein by reference.

FIELD

Embodiments described herein relates to a communication system having a storage function.

BACKGROUND

A wireless communication system includes a system for making communication between communication terminals comprising a storing means such as NANDFLASH memory. For example, data written in a NANDFLASH memory is read when being transmitted, and is exchanged between communication terminals in data communication between cell phones or in data communication between a cell phone and a personal computer. A communication terminal receiving the data writes the data in the NANDFLASH memory.

An error can occur in writing and reading data in and from the storing means such as NANDFLASH memory. Thus, error correction coding/decoding needs to be conducted on the data when the data is written in and read from the storing means.

On the other hand, there is known a technique using an advanced error correction decoding method for better effects at a low coding rate. There is further a technique for changing an error correction coding system or decoding algorithm depending on error situation (See Patent Literature 1, for example).

However, since a complicated error correction decoding method is used for a high error correction capability in a conventional art, an error correction decode processing requires much time, which causes an increase in a processing time for reading and decoding data from a memory, that is an increase in a latency when data is read from the memory.

According to the communication system of the present invention, there is provided a communication system capable of reducing latency when data is read from a memory.

DETAILED DESCRIPTION

According to an embodiment, a communication system comprise:
a first communication terminal, in either a first communication mode or a second communication mode; and
a second communication terminal, in either the first communication mode or the second communication mode; the first communication terminal comprising: a first coding unit configured to code data to generate first coded data, a first memory to store the first coded data therein, a first decoding unit configured to decode the first coded data to generate first decoded data in the first communication mode, and a first communication unit configured to transmit the first decoded data in the first communication mode and to transmit the first coded data in the second communication mode, and
the second communication terminal comprising: a second communication unit configured to receive the first coded data or the first decoded data, a second coding unit configured to code the first decoded data to generate second coded data in the first communication mode, and a second memory to store the second coded data in the first communication mode and to store the first coded data in the second communication mode.

Embodiments will be described below with reference to the drawings.

First Embodiment

Figure 1:
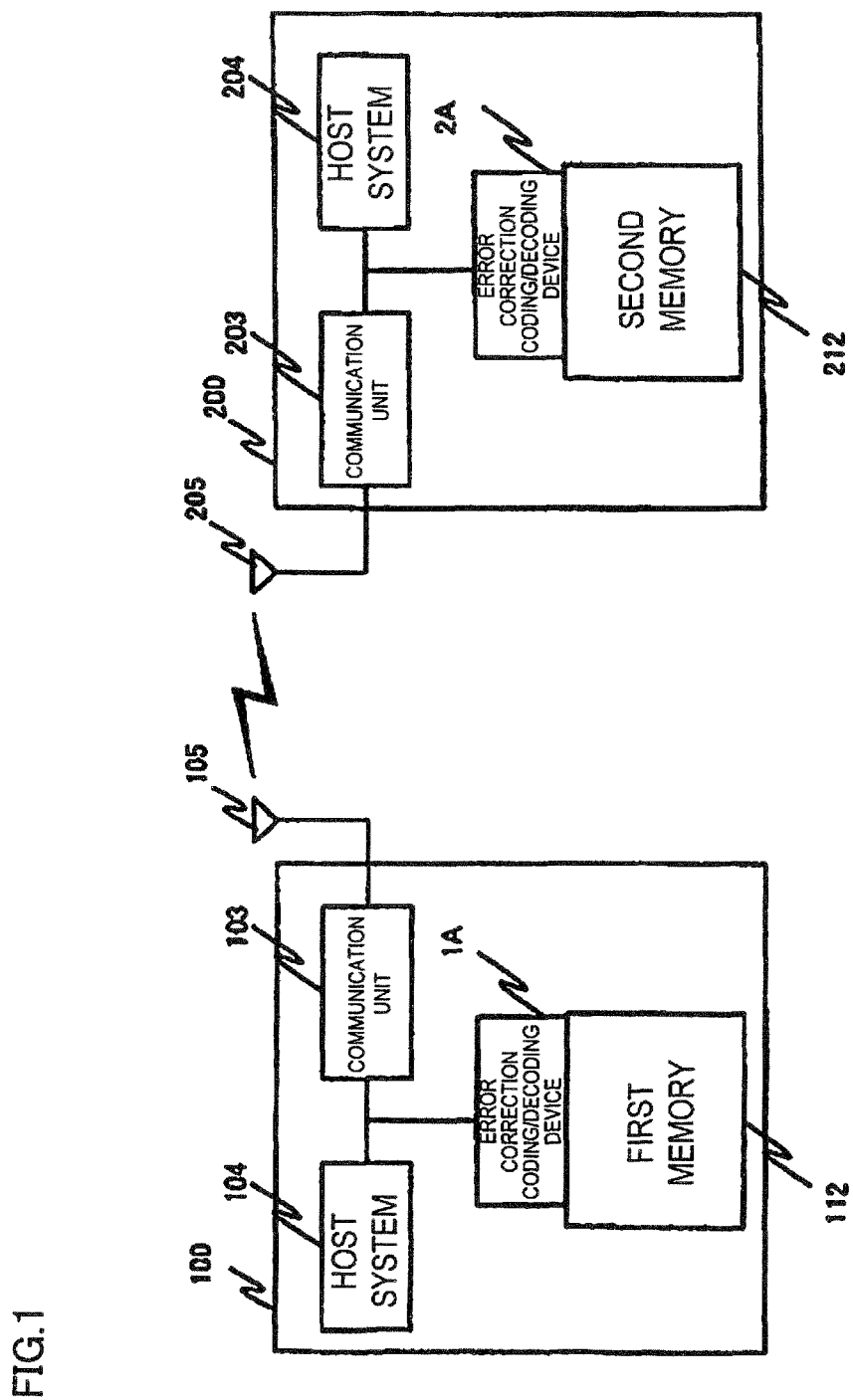
FIG. 1 is a block diagram showing an outline of a communication system according to a first embodiment of the present invention.

FIG. 1 is a diagram showing an outline of a communication system according to a first embodiment. The communication system has communication terminals 100, 200. The communication terminal 100 and the communication terminal 200 make peer-to-peer communication. The communication terminal 100 and the communication terminal 200 exchange data in either a first communication mode or a second communication mode.

The communication terminal 100 comprises a coding unit A106 for coding data to be transmitted and generating first coded data, a first memory 112 for storing the first coded data, a decoding unit A107 for decoding the first coded data read from the first memory 112 and generating first decoded data in the first communication mode, and a communication unit 103 for transmitting the first decoded data in the first communication mode and transmitting the first coded data read from the first memory 112 in the second communication mode. In FIG. 1, a device including the coding unit A106 and the decoding unit A107 is referred to as an error correction coding/decoding device 1A. A detailed structure of the error correction coding/decoding device 1A will be described below.

An error can occur in writing and reading data in and from the first memory 112 such as NANDFLASH memory.

The communication terminal 100 is a cell phone, PDA or laptop PC, for example, and has a host system 104 for controlling peripheral devices such as display. Data to be transmitted is passed from the host system 104 to the error correction coding/decoding device 1A or the communication unit 103. The communication unit 103 performs a signal processing such as modulation or up-conversion on the first decoded data or the first coded data thereby to generate a radio frequency (RF) signal, and transmits the RF signal via an antenna 105.

The communication terminal 100 may include a communication device for making communication with a cell phone base station, for example, in addition to the communication unit 103. In this case, the communication device is controlled by the host system 104.

The communication terminal 200 has a communication unit 203 for receiving a RF signal. The communication unit 203 performs a signal processing such as demodulation or down-conversion on the received RF signal thereby to generate first coded data or first decoded data. The communication terminal 200 has a coding unit A206 for coding the first decoded data to generate second coded data in the first communication mode, a second memory 212 for storing the second coded data in the first communication mode and storing the first coded data in the second communication mode, and a decoding unit A207 for decoding the first coded data and the second coded data. In FIG. 1, the coding unit A206 and the decoding unit A207 are collectively referred to as an error correction coding/decoding device 2A. A detailed structure of the error correction coding/decoding device 2A will be described below.

The communication terminal 200 is a cell phone, PDA or laptop PC, for example, and has a host system 204 for controlling peripheral devices such as display. The communication unit 203 performs the signal processing such as down-conversion or demodulation on the RF signal received from the communication terminal 100 via an antenna 205 thereby to generate the first coded data or the first decoded data. The communication unit 203 passes the first decoded data to the error correction coding/decoding device 2A. The communication unit 203 passes the first coded data to the second memory 212. An error can occur in writing and reading data in and from the second memory 212 such as NANDFLASH memory.

The communication terminal 200 may include a communication device for making communication with a cell phone base station, for example, in addition to the communication unit 203. In this case, the communication device is controlled by the host system 204.

Figure 2:
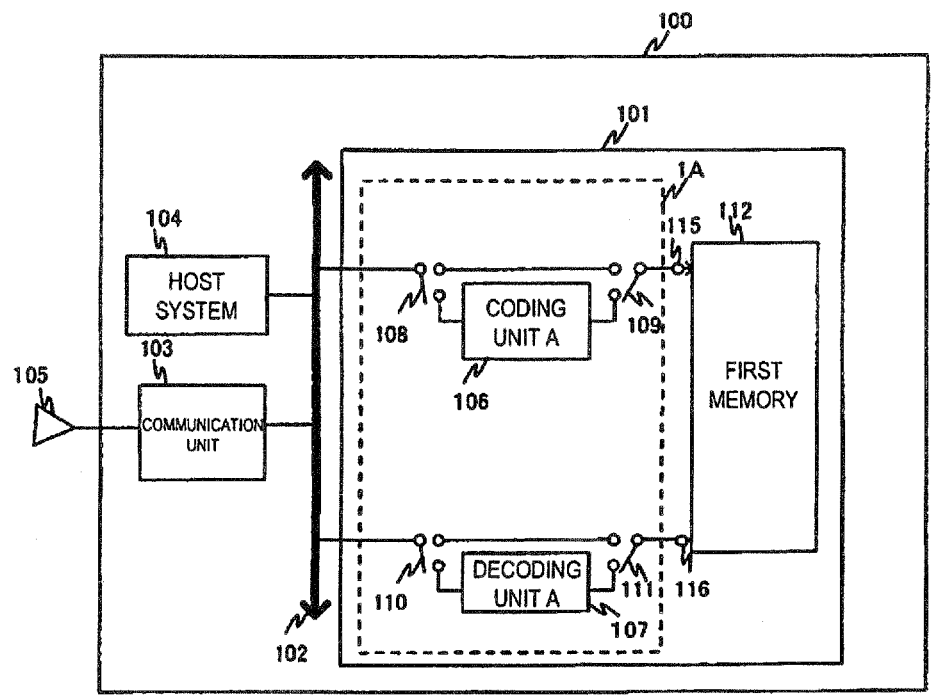
FIG. 2 is a block diagram showing details of the communication system according to the first embodiment of the present invention.
Figure 2:
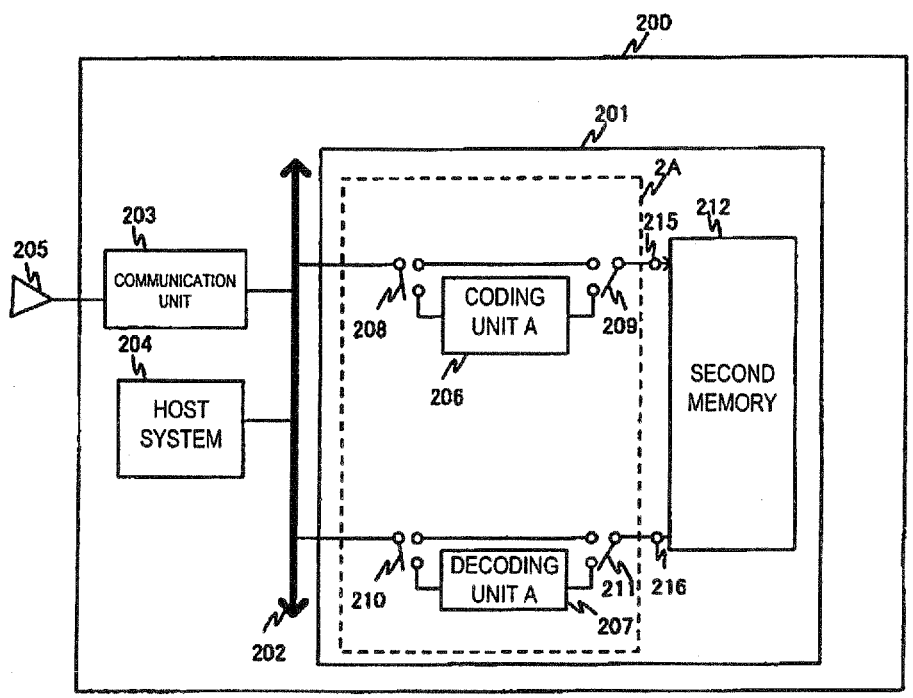

FIG. 2 is a block diagram showing the detailed structures of the communication terminals 100, 200 according to the first embodiment.

The structure of the communication terminal 100 will be described first.

The communication unit 103 is connected to the host system 104 and a memory system 101 via an internal bus 102. The memory system 101 has the first memory 112 and the error correction coding/decoding device 1A. The error correction coding/decoding device 1A has the coding unit A106, the decoding unit A107 and switches 108 to 111.

The first memory 112 has a write port 115 and a read port 116. The write port 115 is connected to the internal bus 102 via the switches 108 and 109, or is connected to the coding unit A106 via the switch 109. The read port 116 is connected to the internal bus 102 via the switches 110 and 111, or is connected to the decoding unit A107 via the switch 111.

The structure of the communication terminal 200 will be described below.

The communication unit 203 is connected to the host system 204 and a memory system 201 via an internal bus 202. The memory system 201 has the second memory 212 and the error correction coding/decoding device 2A. The error correction coding/decoding device 2A has the coding unit A206, the decoding unit A207, and switches 208 to 211.

The second memory 212 has a write port 215 and a read port 216. The write port 215 is connected to the internal bus 202 via the switches 208 and 209, or is connected to the coding unit A206 via the switch 209. The read port 216 is connected to the internal bus 202 via the switches 210 and 211, or is connected to the decoding unit A207 via the switch 211.

The communication unit 103 controls the switches 108 to 111 such that the first memory 112 is connected to the coding unit A106 and the decoding unit A107, when the communication terminals 100, 200 make communication in the first communication mode. The communication unit 203 also controls the switches 208 to 211 such that the second memory 212 is connected to the coding unit A206 and the decoding unit A207. The first communication mode will be referred to as normal mode below. On the other hand, the communication unit 103 controls the switches 110 and 111 such that the first memory 112 is connected to the communication unit 103 via the internal bus 102, when the communication terminals 100, 200 make communication in the second communication mode. The communication unit 203 controls the switches 208, 209 such that the second memory 212 is connected to the communication unit 203 via the internal bus 202. The second communication mode will be referred to as high speed mode below.

A basic operation of the communication system will be described below. An explanation will be made assuming that the communication terminal 100 transmits data to the communication terminal 200.

(Connection Establishment Processing)

The communication terminal 100 and the communication terminal 200 perform a connection establishment processing for establishing connection prior to exchanging data. In the present embodiment, the communication terminals 100, 200 confirm which of the normal mode and the high speed mode the communication terminals 100, 200 correspond to, in addition to the normal connection establishment processing.

Figure 3:
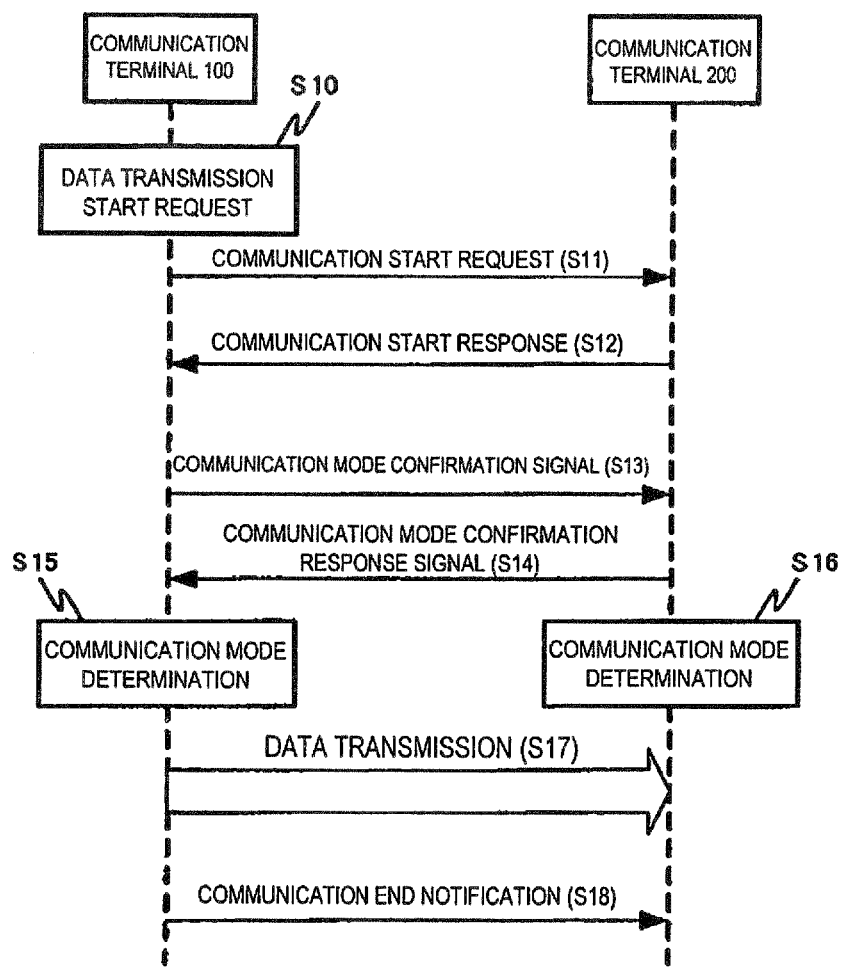
FIG. 3 is a sequence chart showing the operations between communication terminals in the communication system according to the first embodiment of the present invention.

FIG. 3 is a sequence chart showing the connection establishment processing performed by the communication terminal 100 and the communication terminal 200 according to the first embodiment. An explanation will be made assuming that data is transmitted from the communication terminal 100 to the communication terminal 200.

It is assumed that a data transmission start request is made in the communication terminal 100 when the host system 104 generates data destined for the communication terminal 200, such as in response to a data transmission instruction from an application operating on the host system 104 (S10). The data transmission start request is made also when the communication terminal 100 detects an approach of the communication terminal 200 as a communication party by a sensor or the like.

The host system 104 notifies that data destined for the communication terminal 200 is generated to the communication unit 103, and writes the data in the first memory 112 via the coding unit 106. When receiving the notification from the host system 104, the communication unit transmits a communication start request to the communication terminal 200 (S11).

The communication terminal 200 receives the communication start request. When being ready to communicate with the communication terminal 100, the communication terminal 200 transmits a communication start response (S12).

When receiving the communication start response, the communication terminal 100 transmits a communication mode confirmation signal for asking whether the communication terminal 200 is adapted to reception in the high speed mode (S13).

Two conditions are present for making data communication in the high speed mode. The first condition is that the communication terminal 100 and the communication terminal 200 can perform error correction coding/decoding by use of the same coding system. Specifically, it means that the coding unit A106 and the decoding unit A107, and the coding unit A206 and the decoding unit A207 can perform coding or decoding using the same error correction coding system.

The second condition is that when writing and reading data in and from the first memory 112, both the communication terminal 100 and the communication terminal 200 can switch between a mode of performing error correction coding/decoding and a mode of not performing error correction coding/decoding. Specifically, it is required that the communication terminal 100 can switch between coding and not-coding by the coding unit A106, and between decoding and not-decoding by the decoding unit A107, and the communication terminal 200 can switch between coding and not-coding by the coding unit A206, and between decoding and not-decoding by the decoding unit A207.

For example, the communication terminal 100 transmits, to the communication terminal 200, first information indicating a coding system usable by the communication terminal 100 and second information indicating whether the mode of performing error correction coding/decoding and the mode of not performing the same can be switched, as the communication mode confirmation signal. It is assumed that the first information and the second information are managed by the communication unit 103. It is assumed that the communication unit 203 in the communication terminal 200 manages similar information. When receiving the communication mode confirmation signal, the communication terminal 200 uses the first information and the second information contained in the communication mode confirmation signal to confirm whether the coding system of the communication terminal 200 matches with the coding system of the communication terminal 100, and whether both the communication terminal 100 and the communication terminal 200 can switch the mode (normal mode) of performing error correction coding/decoding and the mode (high speed mode) of not performing the same. When the coding system of the communication terminal 200 matches with the coding system of the communication terminal 100 and can switch between the normal mode and the high speed mode, the communication terminal 200 notifies that communication is possible in the high speed mode to the communication terminal 100.

Information contained in the communication mode confirmation signal and a communication mode confirmation response signal is not limited to the example. For example, the communication mode confirmation response signal may contain information on the coding system usable by the communication terminal 200 and information indicating whether the mode of performing error correction coding/decoding and the mode of not performing the same can be switched. In this case, the communication terminal 100 compares the information contained in the communication mode confirmation response signal with the information on the coding system usable by the communication terminal 100 and information on whether the mode of performing error correction coding/decoding and the mode of not performing the same can be switched, and determines whether communication is possible in the high speed mode.

Further, it is possible that the error correction coding system used in the high speed mode and how to address the mode switching is previously defined as part of the communication system, and that whether to address the high speed mode is indicated by a signal of 1 bit to several bits and may be contained in the communication start request and response as the communication mode confirmation signal. Whether to address the high speed mode may be contained as part of capability list converted on the communication start.

When receiving the communication mode confirmation signal, the communication terminal 200 confirms whether the memory system 201 corresponds to the switching between the normal mode and the high speed mode. When the memory system 201 can correspond to the switching between the normal mode and the high speed mode, a determination is made as to whether the system of the error correction processing (error correction system) performed by the coding unit A206 and the decoding unit A207 is the same as the system contained in the communication mode confirmation signal. When the systems are the same, the communication terminal 200 transmits the communication mode confirmation response signal containing the fact that communication is possible in the high speed mode to the communication terminal 100. On the other hand, when the memory system 201 cannot correspond to the switching between the normal mode and the high speed mode, or the error correction system is different from that contained in the communication mode confirmation signal, the communication terminal 100 transmits the communication mode confirmation response signal containing the fact that communication is not possible in the high speed mode or the fact that the normal mode is desired to the communication terminal 100 (S14). The communication terminal 100 transmitting the communication mode confirmation response signal determines the communication mode to either the high speed mode or the normal mode based on the information contained in the communication mode confirmation response signal.

The communication terminal 100 determines the communication mode depending on the communication mode confirmation response signal. When the communication terminal 200 can make communication in the high speed mode, the communication terminal 100 determines to transmit data in the high speed mode. On the other hand, when the communication terminal 200 cannot make communication in the high speed mode or desires the normal mode, the communication terminal 100 determines to transmit data in the normal mode (S15).

When the communication mode is determined, data is transmitted in the determined communication mode from the communication terminal 100 to the communication terminal 200 (S17). When the communication mode is determined, the communication units 103, 203 in the communication terminal 100 and the communication terminal 200 notify a control signal of notifying whether the communication mode is the high speed mode or the normal mode to the memory systems 101, 201, respectively. In response to the control signal, the communication terminals 100 and 200 switch the switches 108 to 111 and the switches 208 to 211 to operate in the normal mode or the high speed mode.

Figure 4:
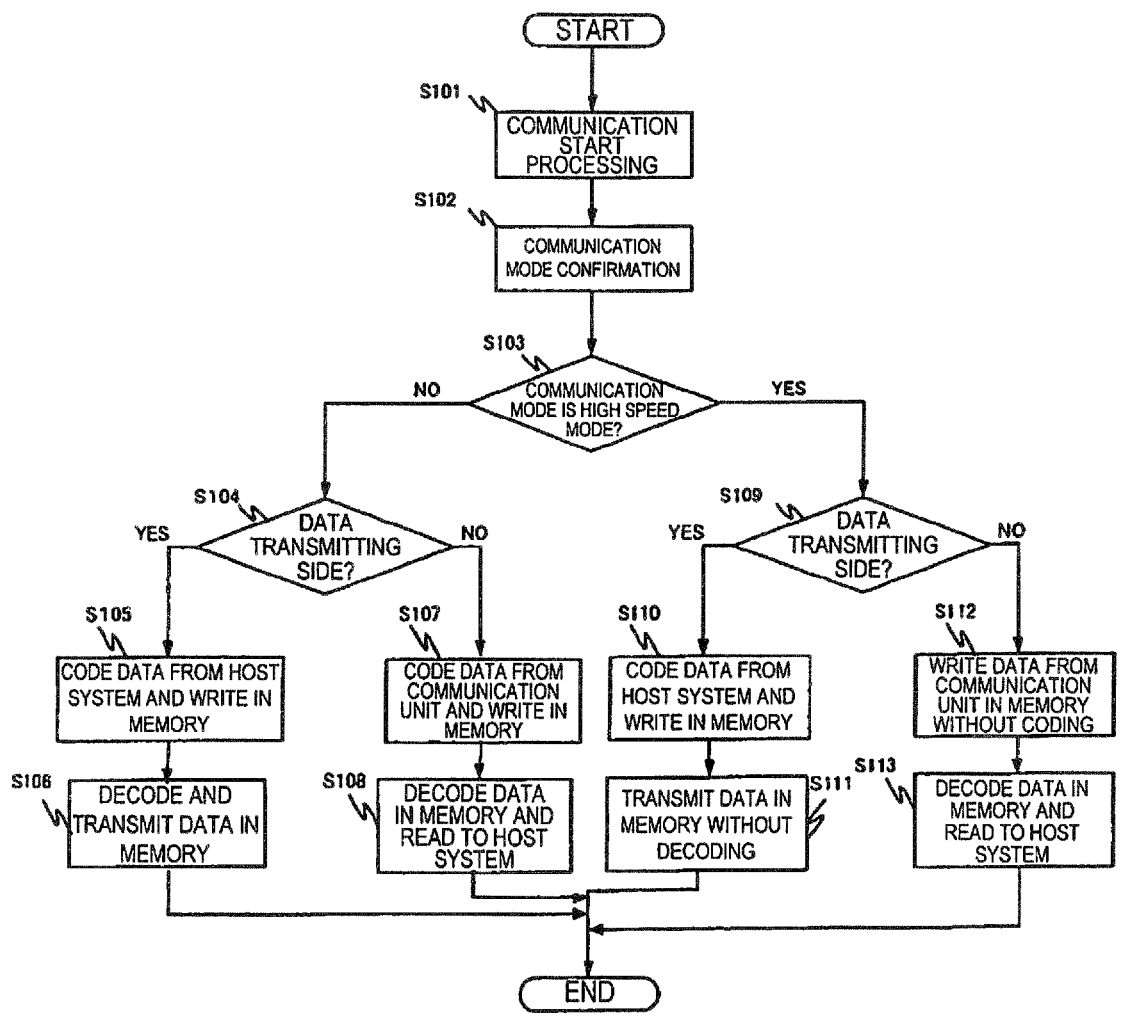
FIG. 4 is a flowchart showing the operations of the communication system according to the first embodiment of the present invention.

A data communication method in each mode will be described below. FIG. 4 is a flowchart showing the operations of the communication terminals 100 and 200 in each mode.

According to the sequence of FIG. 3, the following operations are performed depending on the data transmitting-side device or the data receiving-side device, when a communication start processing is performed between the communication terminal 100 and the communication terminal 200 (S101), the communication mode is confirmed (S102), and when the communication mode is determined (S103).

(Normal Mode)

An explanation will be made first assuming that the communication terminals 100, 200 make communication in the normal mode (NO in S103).

Since the communication terminal 100 is the transmitting-side device (YES in S104), the host system 104 in the communication terminal 100 passes data to be transmitted to the coding unit A106. When receiving the data from the host system 104, the coding unit A106 performs error correction coding on the data and thereby generates first coded data. The coding unit A106 writes the first coded data in the first memory 112 (S105).

When communication with the communication terminal 200 is established, the communication unit 103 instructs the decoding unit A107 to read the data from the first memory 112. The decoding unit A107 reads the first coded data from the first memory 112. The decoding unit A107 performs the error correction decode processing on the first coded data and thereby generates first decoded data. The first decoded data has the same information as the data output by the host system 104. The communication unit 103 performs a signal processing such as modulation or up-conversion on the first decoded data to generate a RF signal. The communication unit 103 transmits the RF signal to the communication terminal 200 via the antenna (S106).

The communication terminal 200 is the receiving-side device (NO in S105). When receiving the RF signal via the antenna 205, the communication unit 203 in the communication terminal 200 performs a signal processing such as demodulation or down-conversion on the RF signal to generate first decoded data. The communication unit 203 outputs the first decoded data to the coding unit A206. The coding unit A206 performs an error correction code processing on the first decoded data to generate second coded data. The coding unit A206 writes the second coded data in the second memory 212 (S107).

The decoding unit A207 reads the second coded data from the second memory 212 in response to an instruction of the host system 204, for example. The decoding unit A207 performs the error correction decode processing on the read second coded data to generate data, and outputs the data to the host system 204 (S108).

(High Speed Mode)

An explanation will be made assuming that the communication terminals 100, 200 make communication in the high speed mode (YES in S103).

Since the communication terminal 100 is the transmitting-side device (YES in S109), the host system 104 in the communication terminal 100 outputs data to be transmitted to the communication terminal 200 to the coding unit A106. When receiving the data from the host system 104, the coding unit A106 performs error correction coding on the data to generate first coded data. The coding unit A106 writes the first coded data in the first memory 112 (S110).

When communication with the communication terminal 200 is established, the communication unit 103 reads the first coded data from the first memory 112. The communication unit 103 performs a signal processing such as modulation or up-conversion on the first coded data to generate a RF signal. The communication unit 103 transmits the RF signal to the communication terminal 200 via the antenna 105 (S111).

The communication terminal 200 is the receiving-side device (NO in S109). When receiving the RF signal via the antenna 205, the communication unit 203 in the communication terminal 200 performs a signal processing such as demodulation or down-conversion on the RF signal to generate first coded data. The communication unit 203 writes the first coded data in the second memory 212 (S112). The decoding unit A207 performs an error correction decode processing on the first coded data in response to an instruction of the host system 204, for example, to generate data, and outputs the data to the host system 204 (S113).

When the data transmission is completed, the communication terminal 100 transmits a communication end notification to the communication terminal 200.

In the above operation flow, when performing the transmitting-side processing, the communication terminal 100 writes the data from the host system 104 in the first memory 112 (S106, S110) after the communication start processing (S101) and the communication mode confirmation and communication mode determination processing (S102, S103). However, the data from the host system 104 may be written in the first memory 112 before the communication start processing (S101) and the communication mode confirmation and communication mode determination processing (S102, S103). Thereby, the data transmission speed can be further enhanced from the communication start.

In the above example, the communication start request and the communication mode confirmation signal are assumed as individual messages, but the communication mode confirmation signal may be contained in the communication start request. Similarly, the communication mode confirmation response signal may be contained in the communication start response.

In the communication system according to the present embodiment, the data communication between the communication terminals 100 and 200 is made in the high speed mode in which the error correction decode processing is not performed on the transmitting side when data is read from the first memory 112 and the error correction code processing is not performed on the receiving side when data is written in the first memory 112, thereby enhancing the data reading speed of the transmitting-side communication terminal and enhancing the data writing speed on the receiving side. Thereby, the speed of the data communication between the communication terminals 100 and 200 can be enhanced. Further, in the high speed mode, the error correction decode processing on the transmitting side is omitted and the error correction code processing is omitted on the receiving side when data is written, thereby reducing power consumption necessary for the error correction code/decode processing.

The error correction coding and the error correction decoding in the communication unit 103 and the communication unit 203 have not been described in the present embodiment. However, the communication unit 103 in the transmitting-side communication terminal 100 may perform error correction coding on data thereby to transmit the data. At this time, the communication unit 203 in the receiving-side communication terminal 200 performs error correction decoding on the received data. With the coding and decoding, an error occurring in the communication path between the communication terminal 100 and the communication terminal 200 can be addressed in a robust manner.

The present embodiment has been described assuming that the communication terminal 100 is on the transmitting side and the communication terminal 200 is on the receiving side. However, the communication terminal 100 is operable on the receiving side and the communication terminal 200 is operable on the transmitting side. In other words, the communication terminal 100 has the functions of the communication terminal 200 and the communication terminal 200 has the functions of the communication terminal 100.

The condition under which the communication terminals 100, 200 make communication in the high speed mode is that the coding units A106, A206 and the decoding units A107, A207 have the same error correction coding/decoding system, but the coding unit A106 in the communication terminal 100 and the decoding unit A207 in the communication terminal 200 have only to use the same error correction coding/decoding system. That is, the first coded data transmitted by the communication terminal 100 in the high speed mode has only to be correctly decoded in the communication terminal 200. The communication terminals 100, 200 may prepare the coding units and the decoding units used for transmission in the normal mode and the coding units and the decoding units used for transmission in the high speed mode, respectively.

There has been described that communication in the high speed mode is made when both the communication terminals 100 and 200 can switch between coding and not-coding and between decoding and not-decoding, but communication in the high speed mode may be made when the communication terminal 100 can switch between decoding and not-decoding and the communication terminal 200 can switch between coding and not-coding.

In this case, the communication terminal 100 transmits, as the communication mode confirmation signal, the first information indicating the coding system usable by the coding unit 106A in the communication terminal 100 and the second information indicating that the decoding unit A107 can switch between decoding and not-decoding to the communication terminal 200. When receiving the communication mode confirmation signal, the communication terminal 200 uses the first information and the second information contained in the communication mode confirmation signal, and determines that communication is possible in the high speed mode when the coding system of the coding unit 106A in the communication terminal 100 matches with the coding system of the decoding unit A207 in the communication terminal 200, the decoding unit A107 in the communication terminal 100 can switch between decoding and not-decoding, and the coding unit A206 in the communication terminal 200 can switch between coding and not-coding. The communication terminal 200 transmits a signal indicating whether communication is possible in the high speed mode as a response to the communication mode confirmation signal.

Second Embodiment

A communication system according to a second embodiment will be described below. The communication system has the communication terminal 100 and a communication terminal 2000.

Figure 5:
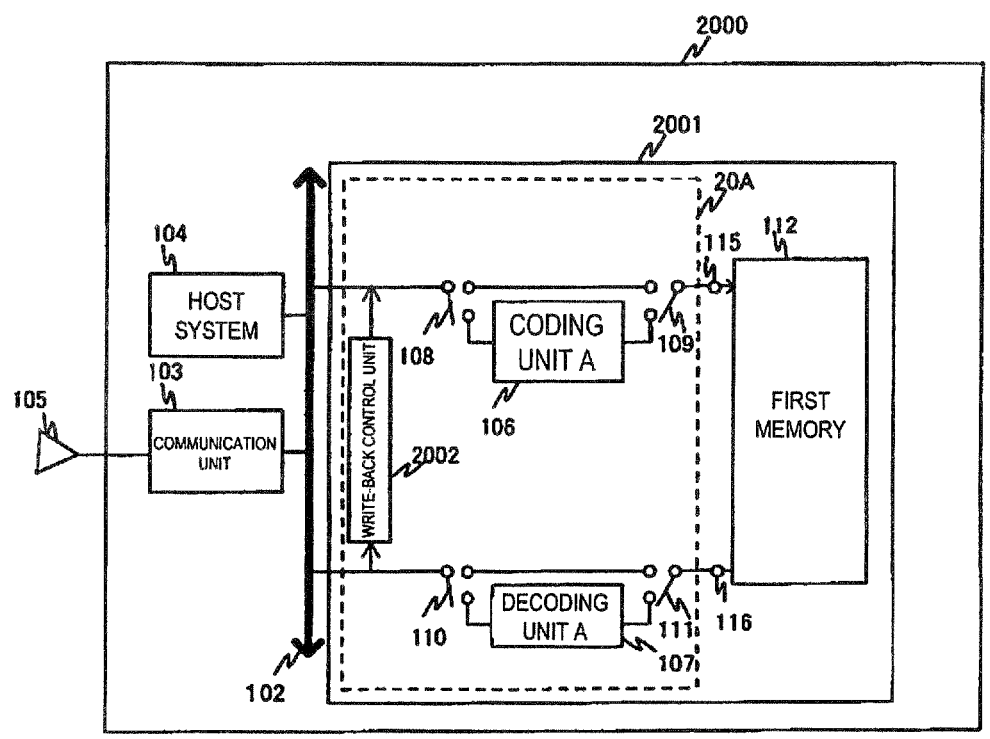
FIG. 5 is a block diagram showing a communication terminal according to a second embodiment of the present invention.
Figure 6:
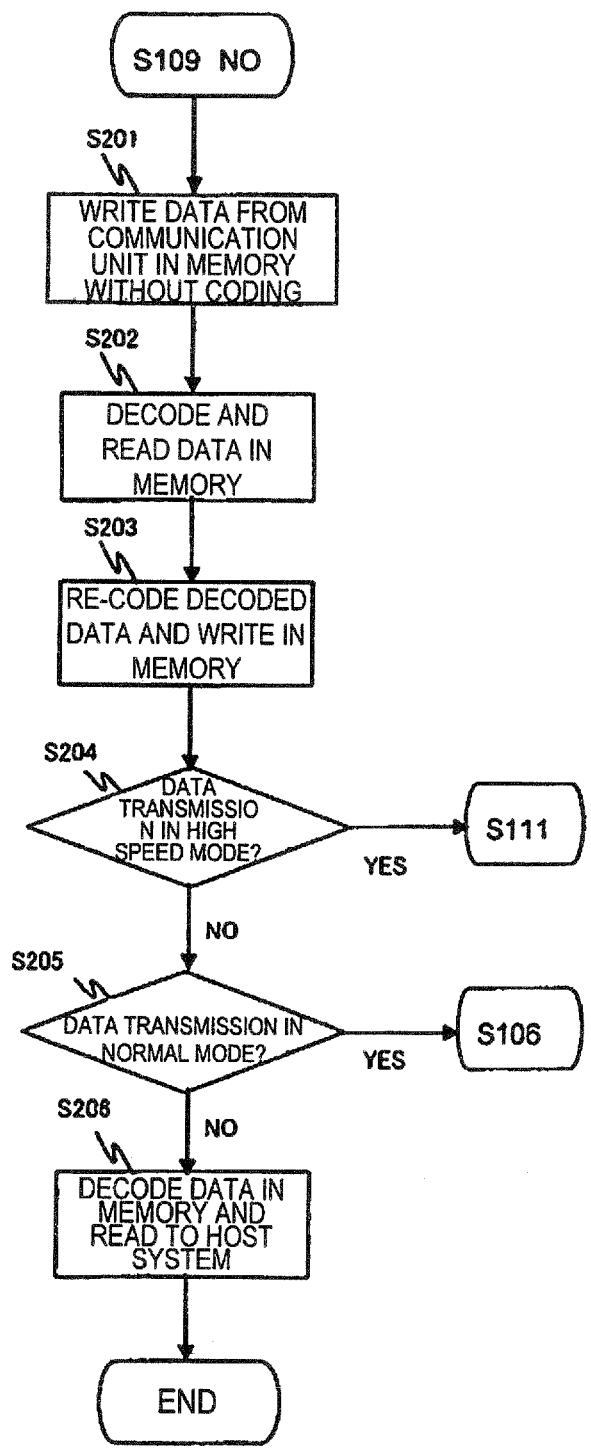
FIG. 6 is a flowchart showing the operations of the communication system according to the second embodiment of the present invention.

FIG. 5 is a block diagram showing a structure of the communication terminal 2000 according to the second embodiment. FIG. 6 is a flowchart showing the operations of the communication terminal 2000 according to the second embodiment.

A memory system 2001 in the communication terminal 2000 has a write-back control unit 2002 in addition to the structure of the communication terminal 200. Other structures of the communication terminal 2000 are the same as those of the communication terminal 200 and thus an explanation thereof will be omitted.

The write-back control unit 2002 is connected at one end to the switch 108 and is connected at the other end to the switch 110. When performing a write-back processing, the write-back control unit 2002 controls the switches 108 to 111 to connect the first memory 112 and the decoding unit A107, to connect the decoding unit A107 and the coding unit A106, and to connect the coding unit A106 and the first memory 112. For the write-back processing, the write-back control unit 2002 controls the first memory 112, the decoding unit A107 and the coding A106 such that the data stored in the first memory 112 is decoded while being read and the decoded data is written in the first memory 112 while being coded.

The write-back control unit 2002 is provided between the switches 108 and 110 in FIG. 5, but there may be configured such that a switch is provided instead of the write-back control unit 2002 and the write-back control unit 2002 controls the switch thereby to switch connection and release between the decoding unit A107 and the coding unit A106.

When receiving the first coded data in the high speed mode, the communication unit 103 writes the first coded data in the first memory 112 without the code processing. When the first coded data received in the high speed mode is stored in the first memory 112, the write-back control unit 2002 controls the switches 110, 111 and the decoding unit A107, such that the decoding unit A107 performs the error correction decode processing on the first coded data thereby to generate second decoded data. The write-back control unit 2002 controls the switches 108, 109 and the coding unit A106, such that the error correction code processing is performed on the second decoded data thereby to generate second coded data. The coding unit A106 writes the second coded data in the first memory 112.

The operations of the communication terminal 2000 will be described below. The processing between the reception of the data in the high speed mode and the write in the first memory 112 are the same as those in FIG. 4 and thus an explanation thereof will be omitted.

The communication terminal 2000 writes the first coded data received by the communication unit 103 in the first memory 112 (S201).

When receiving a communication end notification from the transmitting-side communication terminal, the communication unit 103 notifies the communication end notification to the write-back control unit 2002. When receiving the communication end notification, the write-back control unit 2002 reads the first coded data written in the first memory 112, performs the error correction decode processing on the first coded data, and controls the decoding unit A107 thereby to generate second decoded data (S202).

The write-back control unit 2002 performs the error correction code processing on the second decoded data to generate third coded data, and controls the coding unit A106 to write back the third coded data in the first memory 112 (S203). The communication terminal 2000 returns to step S111 in FIG. 4 to perform the transmission processing When the data written back in the first memory 112 is transmitted in the high speed mode (YES in S204). The communication terminal returns to step S106 in FIG. 4 to perform the transmission processing when the data written back in the first memory 112 is transmitted in the normal mode (YES in S205). When reading the data from the first memory 112 for using the data, the host system 104 reads the data while the decoding unit A107 is performing the error correction decode processing on the third coded data (S206).

As described above, in the communication terminal 2000 and the communication system according to the second embodiment, similar effects to those of the first embodiment can be obtained, and an error occurring in writing and reading data in and from the first memory 112 can be prevented from propagating when the communication terminal receiving data in the communication in the high speed mode transmits the data in the communication in the high speed mode.

Third Embodiment

A communication system according to a third embodiment will be described with reference to FIG. 7. The communication system according to the present embodiment has a communication terminal 300 and a communication terminal 400. The communication system according to the present embodiment is different in the coding system between the normal mode and the high speed mode.

Figure 7:
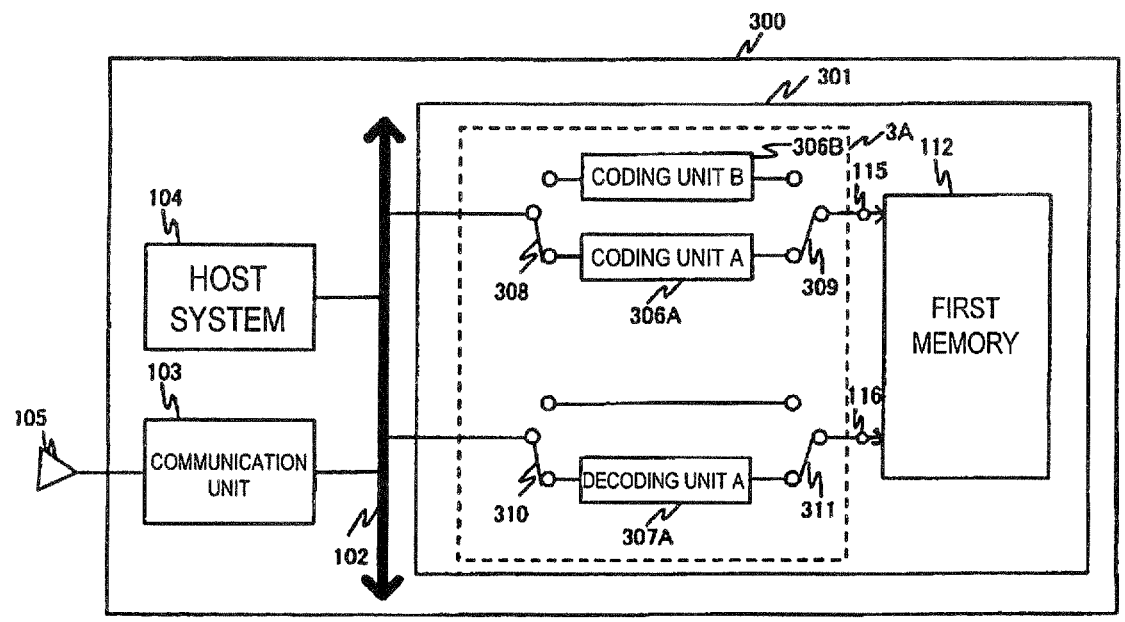
FIG. 7 is a block diagram showing a communication system according to a third embodiment of the present invention.
Figure 7:
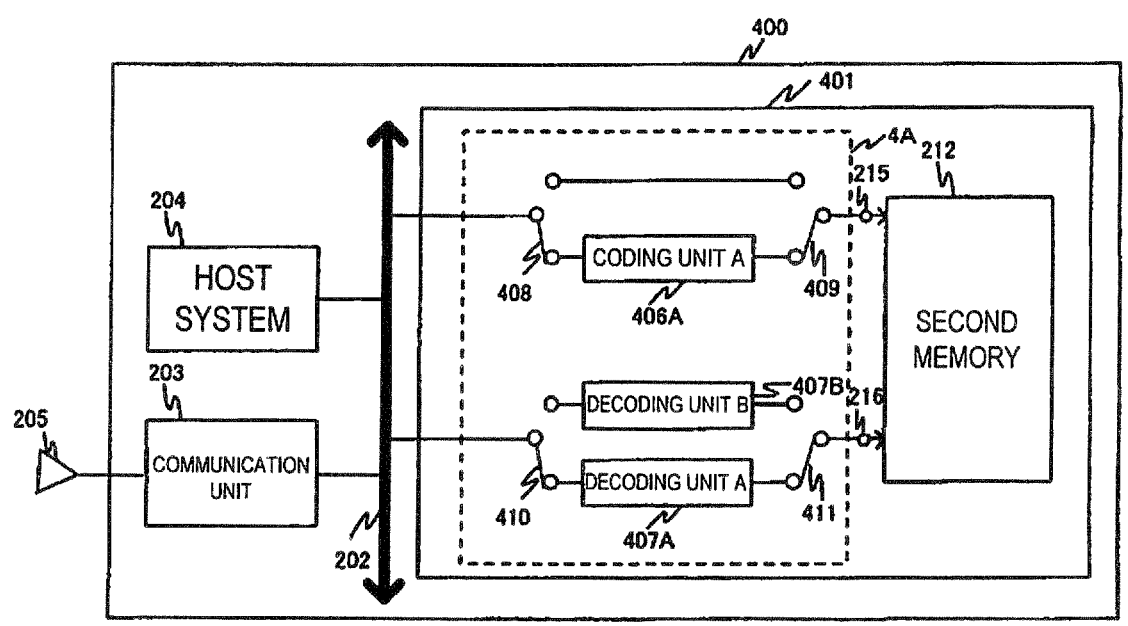

FIG. 7 is a block diagram showing a structure of the communication terminal 300 according to the third embodiment.

A structure will be described below, which is different from that of the communication 100 according to the first embodiment. An explanation of the constituents will be omitted, which have the same structures and functions as those of the communication terminal 100.

The communication terminal 300 has a coding unit A 306A, a coding unit B 306B, and a decoding unit A 307A. The coding unit A 306A performs error correction coding on data received from the host system 104 according to a coding system A to generate first coded data, and writes it in the first memory 112. The coding unit B 306B performs error correction coding on data received from the host system 104 according to a coding system B to generate second coded data, and writes it in the first memory 112. The first memory 112 stores the first coded data and the second coded data therein. The decoding unit 307A reads the first coded data from the first memory 112, and decodes the first coded data according to the coding system A to generate first decoded data.

It is assumed that the coding system B has a higher error correction capability than the coding system A. For example, it is assumed that the coding system B has a lower coding rate than the coding system A. As a coding rate setting method, there is a method for setting the coding rates of the coding system A and the coding system B such that an error rate obtained by performing error correction decoding on data having an error rate r according to the coding system A when the read/write processing by the first memory 112 is performed once is as much as an error rate obtained by performing error correction decoding on data having an error rate r' according to the coding system B when the read/write processing by the first memory 112 is performed twice.

As a method for enhancing the error correction capability, there is a method in which a correction capability for bit missing of the coding system B is enhanced as compared with the coding system A. Here, the bit missing is an error that 0/1 is completely reversed irrespective of a value written in the cells of the first memory 112. For example, when a convolution code is used for the coding system A, a convolution code for inner code and a Reed-Solomon code for outer code are used in the coding system B, thereby enhancing the bit missing correction capability.

Switches 308 and 309 select the connection between the write port 115 and the internal bus 102 via the coding unit A 306A or via the coding unit B 306B. A switch 310 and a switch 311 select the connection between the read port 116 and the internal bus 102 via the decoding unit A 307A or the direct connection between the read port 116 and the internal bus 102.

A structure of the communication terminal 400 will be described below with reference to FIG. 7. A structure difference from that of the communication terminal 200 according to the first embodiment will be described. An explanation of the constituents will be omitted, which have the same structures and functions as those of the communication terminal 200.

The communication terminal 400 has a coding unit A 406A, a decoding unit A 407A and a decoding unit B 407B. The coding unit A 406A performs error correction coding on the first decoded data received from the communication unit 203 according to the coding system A thereby to generate third coded data. The coding unit A 406A writes the third coded data in the second memory 212.

The decoding unit 407A reads the third coded data from the second memory 212, and performs error correction decoding on the third coded data according to the coding system A thereby to generate third decoded data. The decoding unit 407A passes the third decoded data to the host system 204. The decoding unit 407B reads the second coded data from the second memory 212, and performs error correction decoding on the second coded data according to the coding system B thereby to generate second decoded data. The decoding unit 407B passes the second decoded data to the host system 204.

Switches 408 and 409 select the connection between the write port 215 and the internal bus 202 via the coding unit A 406A or the direct connection between the write port 215 and the internal bus 202. A switch 410 and a switch 411 select the connection between the read port 216 and the internal bus 202 via the decoding unit A 407A or via the decoding unit B 407B.

Figure 8:
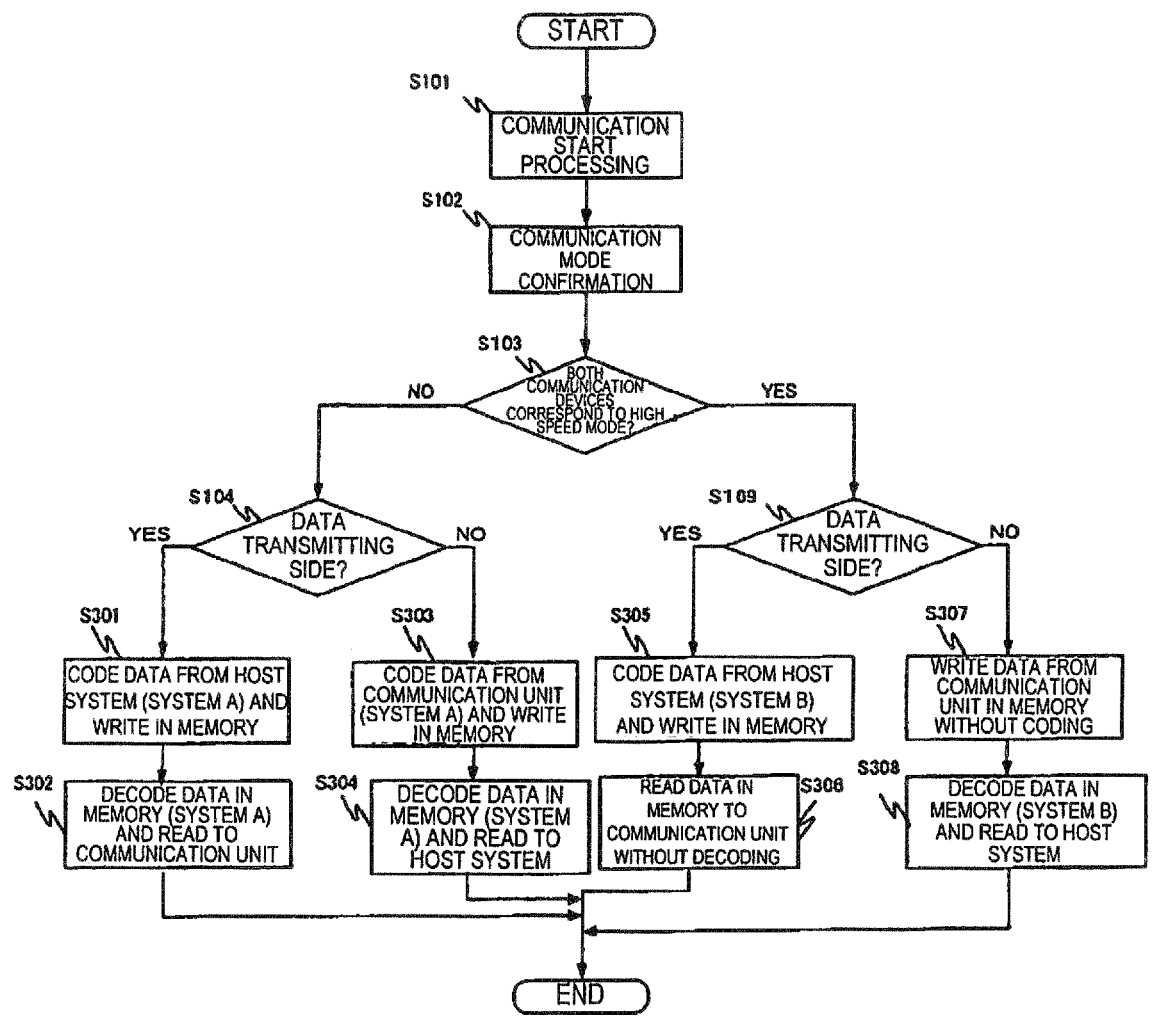
FIG. 8 is a flowchart showing the operations of the communication system according to the third embodiment of the present invention.

The operations of the communication system according to the present embodiment will be described below. FIG. 8 is a flowchart showing the operations of the communication system. The same operations as those of FIG. 4 are denoted with the same reference numerals, and an explanation thereof will be omitted.

(Normal Mode)

An explanation will be made first assuming that the communication terminals 300 and 400 communicate in the normal mode.

Since the communication terminal 300 is the transmitting-side device, the host system 104 in the communication terminal 300 passes data to be transmitted to the coding unit A 306A. The coding unit A 306A performs error correction coding on data generated by the host system 104 according to the coding system A thereby to generate first coded data. The coding unit A 306A writes the first coded data in the first memory 112 (S301). At this time, the switches 308 and 309 are connected to the coding unit A 306A side. The communication unit 103 instructs the decoding unit A 307A to read the data from the first memory 112. The decoding unit A 307A reads the first coded data from the first memory 112, performs the error correction decode processing on the first coded data according to the coding system A to generate first decoded data, and transfers the first decoded data to the communication unit 103 (S302). At this time, the switches 310 and 311 are connected to the decoding unit 307A side. The communication unit 104 performs a signal processing on the first coded data to generate a RF signal, and transmits the RF signal to the communication terminal 400.

The communication terminal 400 is the receiving-side device. When receiving the RF signal via the antenna 205, the communication unit 203 in the communication terminal 400 performs a signal processing on the RF signal to generate first decoded data. The coding unit A 406A performs the error correction code processing on the first decoded data according to the coding system A to generate third coded data. The coding unit A 406A writes the third coded data in the second memory 212 (S303). At this time, the switches 408 and 409 are connected to the coding unit 406A side. The decoding unit A 407A reads the third coded data from the second memory 212 in response to an instruction from the host system 204. The decoding unit A 407A performs error correction decoding on the read third coded data according to the coding system A to generate data, and outputs the data to the host system 204 (S304). At this time, the switches 410 and 411 are connected to the decoding unit A 407A side.

(High Speed Mode)

An explanation will be made below assuming that the communication terminals 300 communicate with 400 in the high speed mode.

Since the communication terminal 300 is the transmitting-side device, the host system 104 in the communication terminal 300 passes data to be transmitted to the coding unit 306B. The coding unit 306B performs error correction coding on the data generated by the host system 104 according to the coding system B to generate second coded data. The coding unit 306B writes the second coded data in the first memory 112 (S305). At this time, the switches 308 and 309 are connected to the coding unit 306B side. The communication unit 103 reads the second coded data from the first memory 112 without decoding it (S306). The communication unit 103 performs a signal processing on the second coded data to generate a RF signal, and transmits the RF signal to the communication terminal 400. At this time, the switches 310 and 311 directly connect the read port 116 and the internal bus 102.

The communication terminal 400 is the receiving-side device. When receiving the RF signal via the antenna 205, the communication unit 203 in the communication terminal 400 performs a signal processing on the RF signal to generate second coded data. The communication unit 202 writes the received second coded data in the second memory 212 (S307). At this time, the switches 408 and 409 directly connect the write port 215 and the internal bus 202. The decoding unit 407B reads the second coded data from the second memory 212 in response to an instruction from the host system 204. The decoding unit 407B performs error correction decoding on the read second coded data according to the coding system B to generate data, and outputs the data to the host system 204 (S308). At this time, the switches 410 and 411 are connected to the decoding unit B 407B side.

In the above operation flow, when the communication terminal 300 performs the transmitting-side processing, the data from the host system 104 is written in the first memory 112 (S301, S307) after the communication start processing (S101) and the communication mode confirmation and communication mode determination processing (S102, S103). However, the data from the host system 104 may be written in the first memory 112 before the communication start processing (S101) and the communication mode confirmation and communication mode determination processing (S102, S103). Thereby, the speed of the data transmission can be enhanced from the communication start.

At this time, until the communication mode is determined, a coding system for writing the data from the host system 104 in the first memory 112 cannot be determined as the coding system A or the coding system B. Thus, for example, this case is addressed by performing the code processing to write the data in the first memory 112 in both the coding system A and the coding system B, and then reading the data coded by either the coding system A or B depending on the results of the communication mode confirmation and communication mode determination processing (S102, S103).

In the communication system using the communication terminal 300 according to the third embodiment, similar effects to those according to the first embodiment can be obtained, and the coding system having a high error correction capability is used to perform coding and decoding in the high speed mode, thereby reducing a data error rate. Thus, according to the communication terminal 300, the data transmission speed can be enhanced due to the reduced data error rate and the reduced latency on reading. Further, a decrease in power consumption can be achieved.

Figure 9:
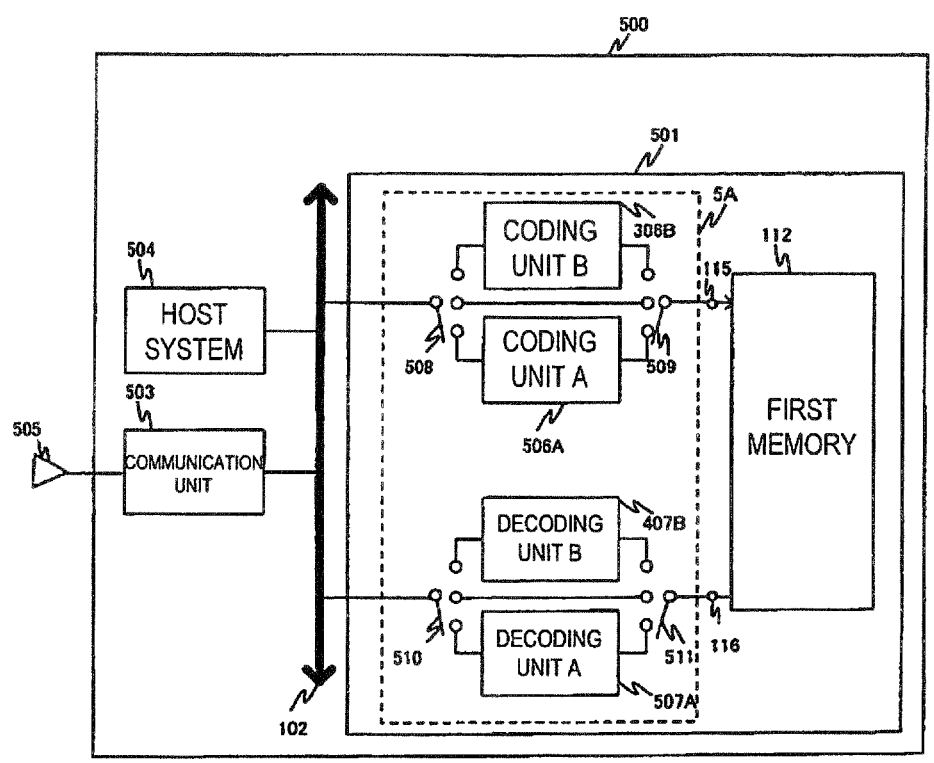
FIG. 9 is a block diagram showing a data-exchangeable communication terminal according to the third embodiment of the present invention.

The present embodiment has been described assuming that the communication terminal 300 is on the transmitting side and the communication terminal 400 is on the receiving side, but one communication terminal may be configured to both transmit and receive data. An exemplary communication terminal 500 capable of both transmitting and receiving data is shown in FIG. 9.

The communication terminal 500 is a cell phone, PDA, or laptop PC, for example. The communication terminal 500 has a host system 504 for controlling peripheral devices such as liquid crystal display. The host system 504 generates transmission data to be transmitted by the communication terminal 500. The communication terminal 500 has a coding unit A 506A for coding the transmission data generated by the host system 504 or reception data received from a communication party according to the coding system A and thereby generating first coded data, and the coding unit B 306B for coding the transmission data according to the coding system B thereby to generate second coded data. The first and second coded data generated by the coding units A 506A, B 306B are written in the first memory 112.

The communication terminal 500 has a decoding unit 507A for decoding the first coded data stored in the first memory 112 according to the coding system A thereby to generate first decoded data, and the decoding unit B 407B for decoding the second coded data according to the coding system B thereby to generate second decoded data. The decoding unit A 507A passes the first decoded data to the host system 504 or a communication unit 503 described later. The decoding unit B 507B passes the second decoded data to the host system 504. The host system 504 displays the received first decoded data or second decoded data on a liquid crystal display (not shown), for example, and uses the first decoded data or the second decoded data to control the peripheral devices.

The communication terminal 500 has the communication unit 503 for performing a signal processing on the first decoded data or the second coded data to generate a RF signal and transmitting the RF signal via an antenna 505. The communication unit 503 performs a signal processing on the RF signal received via the antenna 505 to generate reception data.

The communication terminal 505 has switches 508 to 511. The switches 508 to 511 select the connection between the first memory 112 and the internal bus 102 in response to an instruction of the communication unit 503. Specifically, when connecting the write port 115 of the first memory 112 and the internal bus 102, the switches 508, 509 select the direct connection between the write port 115, the internal bus 102 via the coding unit A 506A or the connection via the coding unit B 306B. The switches 508, 509 are connectively referred to as first switch. When connecting the read port 116 of the first memory 112 and the internal bus 102, the switches 510, 511 select the direct connection between the read port 116 and the internal bus 102, the connection via the decoding unit A 507A or the connection via the decoding unit B 407B. The switches 510, 511 are collectively referred to as second switch.

The coding unit A 506A operates as the coding unit A 306A of FIG. 7 when the communication terminal 505 operates as the transmitting-side device, and operates as the coding unit A 406A of FIG. 7 when the communication terminal 505 operates as the receiving-side device. The decoding unit 507A operates as the decoding unit A 307A of FIG. 7 when the communication terminal 505 operates as the transmitting-side device, and operates as the decoding unit A 407A when the communication terminal 505 operates as the receiving-side device.

Thus, when the communication terminal 500 transmits transmission data in the normal mode, the switches 508,509 operate to connect the write port 115 and the internal bus 102 via the coding unit A 506A. The switches 510, 511 operate to connect the read port 116 and the internal bus 102 via the decoding unit A 507A. When the communication terminal 500 transmits transmission data in the high speed mode, the switches 508,509 operate to connect the write port 115 and the internal bus 102 via the coding unit B 306B. The switches 510, 511 operate to directly connect the read port 116 and the internal bus 102.

When the communication terminal 500 receives reception data in the normal mode, the switches 508, 509 operate to connect the write port 115 and the internal bus 102 via the coding unit A 506A. The switches 510, 511 operate to connect the read port 116 and the internal bus 102 via the decoding unit A 507A. When the communication terminal 500 receives reception data in the high speed mode, the switches 508, 509 operate to directly connect the write port 115 and the internal bus 102. The switches 510, 511 operate to connect the read port 116 and the internal bus 102 via the decoding unit 407B. Other operations are the same as those of the communication terminal 300 of FIG. 7 when the communication terminal 500 operates as the transmitting-side device and those of the communication terminal 400 of FIG. 7 when the communication terminal 500 operates as the receiving-side device.

Fourth Embodiment

A communication system according to a fourth embodiment will be described with reference to FIG. 10. The communication system according to the present embodiment has a communication terminal 600 and a communication terminal 700.

Figure 10:
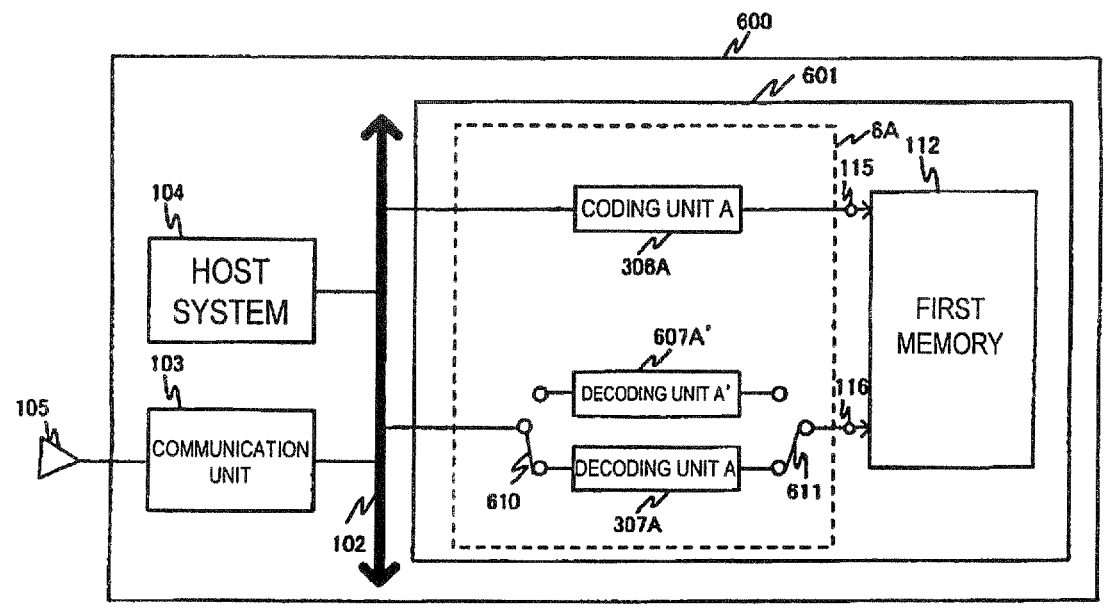
FIG. 10 is a block diagram showing a communication system according to a fourth embodiment of the present invention.
Figure 10:
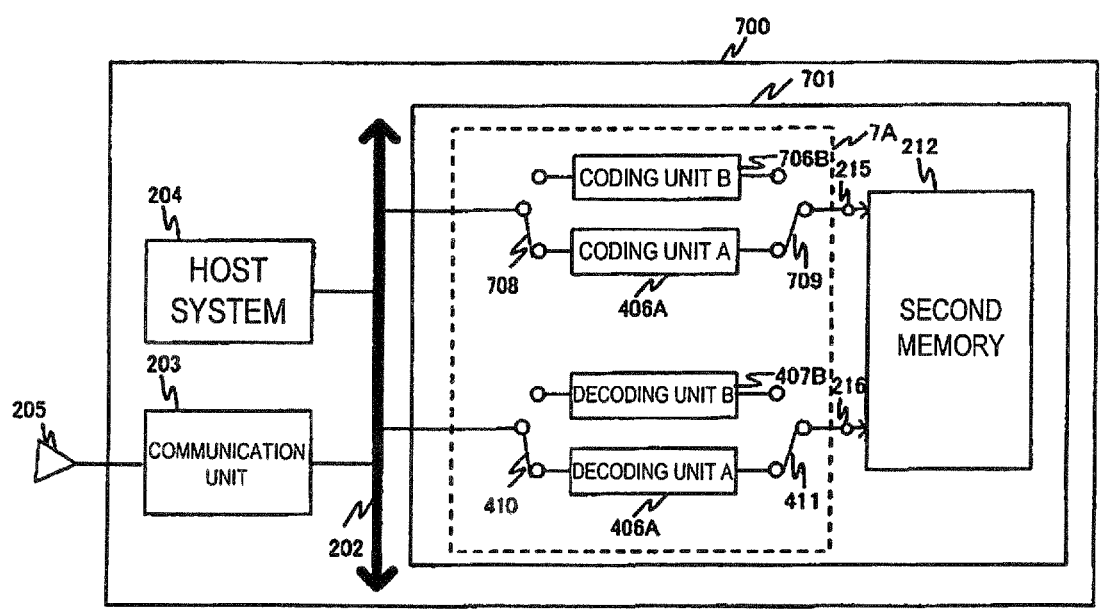

FIG. 10 is a block diagram showing a structure of the communication terminal 600 according to the fourth embodiment.

A structure according to the fourth embodiment will be described below, which is different from that of the communication terminal 300. An explanation of the constituents will be omitted, which have the same structures and functions as those of the communication terminal 300.

The communication terminal 600 has a decoding unit A'607A' in addition to the structure of the communication terminal 300 as shown in FIG. 7. The communication terminal 600 neither has the coding unit 306B nor the switches corresponding to the switches 308 and 309. It has switches 610, 611 instead of the switches 310 and 311.

The decoding unit A'607A' performs a second decode processing A' on first coded data to generate second decoded data according to the coding system A. The decoding unit 307A and the decoding unit A'607A' are the same in the coding system but different in a decode processing. This is because the decoding unit A307A and the decoding unit A'607A' may apply a different algorithm. For example, even when the decoding unit A307A and the decoding unit A'607A' correspond to a convolution coding system, the decoding unit A 307A may apply maximum likelihood decoding algorithm and the decoding unit A' 607A' may apply Viterbi decoding algorithm. In this case, even when the decoding unit A 307A and the decoding unit A' 607A' employ the same coding system, a first decode processing A performed by the decoding unit A 307A is different from the second decode processing A' performed by the decoding unit A' 607A'. Further, even when the same algorithm is applied, the first decode processing A performed by the decoding unit A 307A is different from the second decode processing A' performed by the decoding unit A' 607A' due to the number of repetition processing or a difference between soft decision and hard decision.

It is assumed that the second decode processing A' has shorter processing time and more simplified configuration than the first decode processing A.

For example, when both the first decode processing A and the second decode processing A' correspond to the convolution coding system, the first decode processing A applies the maximum likelihood decoding algorithm and the second decode processing A' applies the Viterbi decoding algorithm. As another example, the first decode processing A assumes a soft decision value as input, and the second decode processing A' assumes a hard decision value as input. As still another example, the first decode processing A and the second decode processing A' need a repetition processing, and the second decode processing A' has less number of repetition times than the first decode processing A. The decode processing necessary for the repetition processing is a decode processing for turbo coding and a decode processing for LDPC coding, for example.

The switches 610, 611 select the connection between the read port 116 and the internal bus 102 via the decoding unit A307A or the connection via the decoding unit A'607A' depending on a difference between the normal mode and the high speed mode.

There is provided below a block diagram showing a structure of the communication terminal 700 according to the fourth embodiment in FIG. 10. A structure will be described below, which is different from that of the communication terminal 400 according to the third embodiment. An explanation of the constituents will be omitted, which has the same structures and functions as those of the communication terminal 400.

The communication terminal 700 has a coding unit B706B in addition to the structure of the communication terminal 400 shown in FIG. 7. The communication terminal 700 has switches 708, 709 instead of the switches 408, 409.

The coding unit B706B performs error correction coding on the second decoded data received by the communication unit 203 via the antenna 205 according to the coding system B to generate second coded data.

It is assumed that the coding system B has higher in the error correction capability than the coding system A. A method for enhancing the error correction capability is preferably a method for enhancing the coding system B in the correction capability for bit missing as compared with the coding system A.

The switches 708, 709 select the connection between the write port 215 and the internal bus 202 via the coding unit A406A or the connection via the coding unit B706B in response to an instruction of the communication unit 203.

Figure 11:
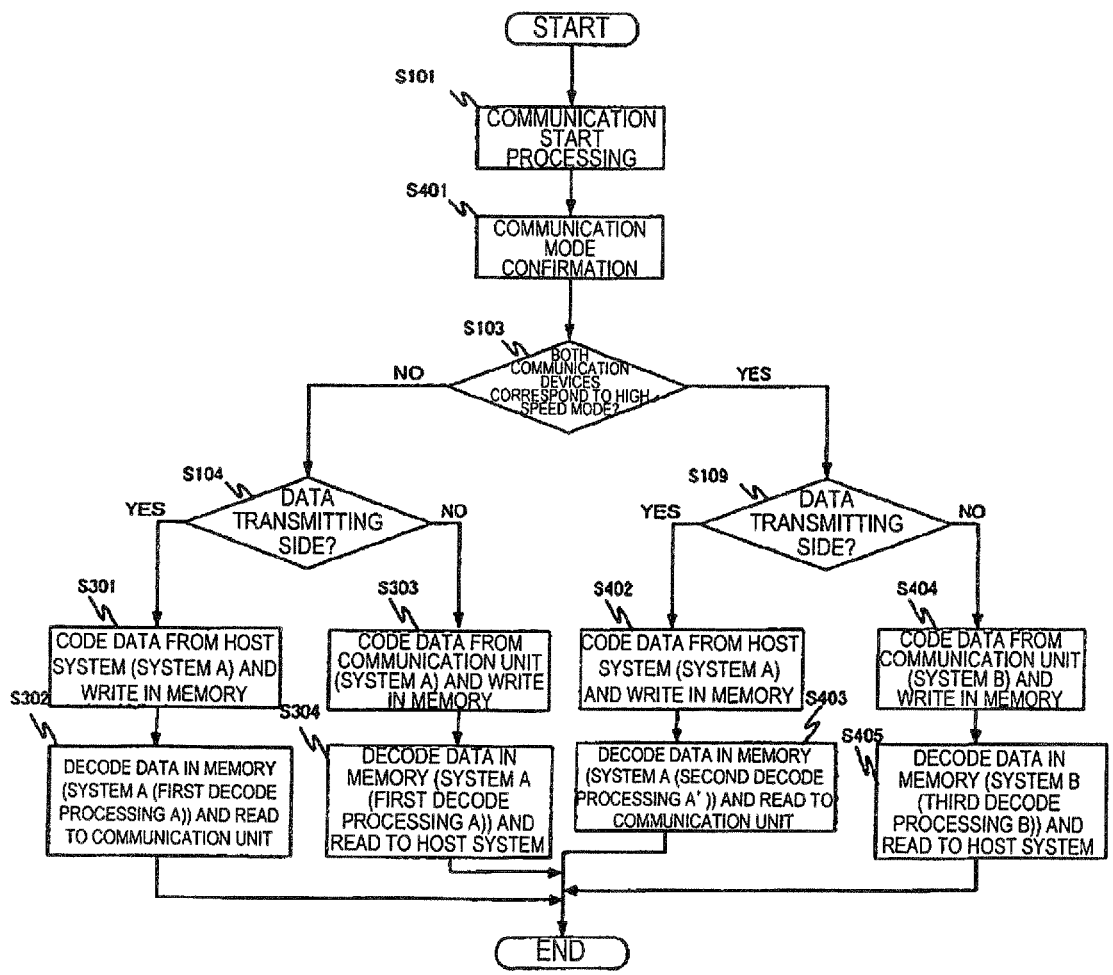
FIG. 11 is a flowchart showing the operations of the communication system according to the fourth embodiment of the present invention.

The operations of the communication system according to the present embodiment will be described below. FIG. 11 is a flowchart showing the operations of the communication system according to the present embodiment. The same operations as those of FIG. 4 are denoted with the same reference numerals, and an explanation thereof will be omitted. The operations in the normal mode are the same as the operations of the communication system shown in FIG. 8, and thus an explanation thereof will be omitted.

(High Speed Mode)

An explanation will be made assuming that the communication terminals 600, 700 make communication in the high speed mode.

Since the communication terminal 600 is the transmitting-side device, the host system 104 in the communication terminal 600 passes data to be transmitted to the coding unit A 306A. The coding unit A 306A performs error correction coding on the data received from the host system 104 according to the coding system A to generate first coded data. The coding unit A 306A writes the first coded data in the first memory 112 (S402). The decoding unit A' 607' reads the first coded data from the first memory 112 in response to an instruction from the communication unit 103, and performs error correction decoding on the first coded data according to the coding system A to generate second decoded data (S403). The communication unit 103 performs a signal processing on the second decoded data to generate a RF signal, and transmits the RF signal to the communication terminal 700. The switches 601, 611 connect the read port 116 to the internal bus 102 via the decoding unit A' 607A' at this time.

The communication terminal 700 is the receiving-side device. When receiving the RF signal via the antenna 205, the communication unit 203 in the communication terminal 700 performs a signal processing on the RF signal to generate second decoded data.

The coding unit B 706B performs error correction coding on the second decoded data according to the coding system B to generate second coded data. The coding unit B 706B writes the second coded data in the second memory 212 (S404). At this time, the switches 708, 709 connect the write port 215 and the internal bus 202 via the coding unit B 706B.

The decoding unit B 407B reads the second coded data from the second memory 212 in response to an instruction from the host system 204. The decoding unit B 407B performs error correction decoding on the read second coded data according to the coding system B to generate data, and outputs the data to the host system 204 (S405). At this time, the switches 410 and 411 are connected to the decoding unit B407B.

In the above operation flow, when the communication terminal 400 performs the transmitting-side processing, the data from the host system 104 is written in the first memory 112 (S301, S402) after the communication start processing (S101) and the communication mode confirmation and communication mode determination processing (S401, S103). However, the data from the host system 104 may be written in the first memory 112 before the communication start processing (S101) and the communication mode confirmation and communication mode determination processing (S401, S103). Thus, the speed of the data transmission can be enhanced from the communications start.

In the communication system according to the fourth embodiment, the error correction coding is performed in writing data in the high speed mode, thereby reducing the data error rate, and the decode processing performed in reading data is made shorter in the processing time in transmitting data, thereby enhancing the data transmission speed. Further, the coding system having a high error correction capability is used to perform coding and decoding in receiving data, thereby reducing the data error rate. Thus, when the communication terminal 600 makes communication, the data error rate can be reduced and the data transmission speed can be enhanced. The transmitting-side communication terminal simplifies the decode processing performed in reading data to be short in the processing time in the high speed mode, thereby achieving a decrease in power consumption.

Figure 12:
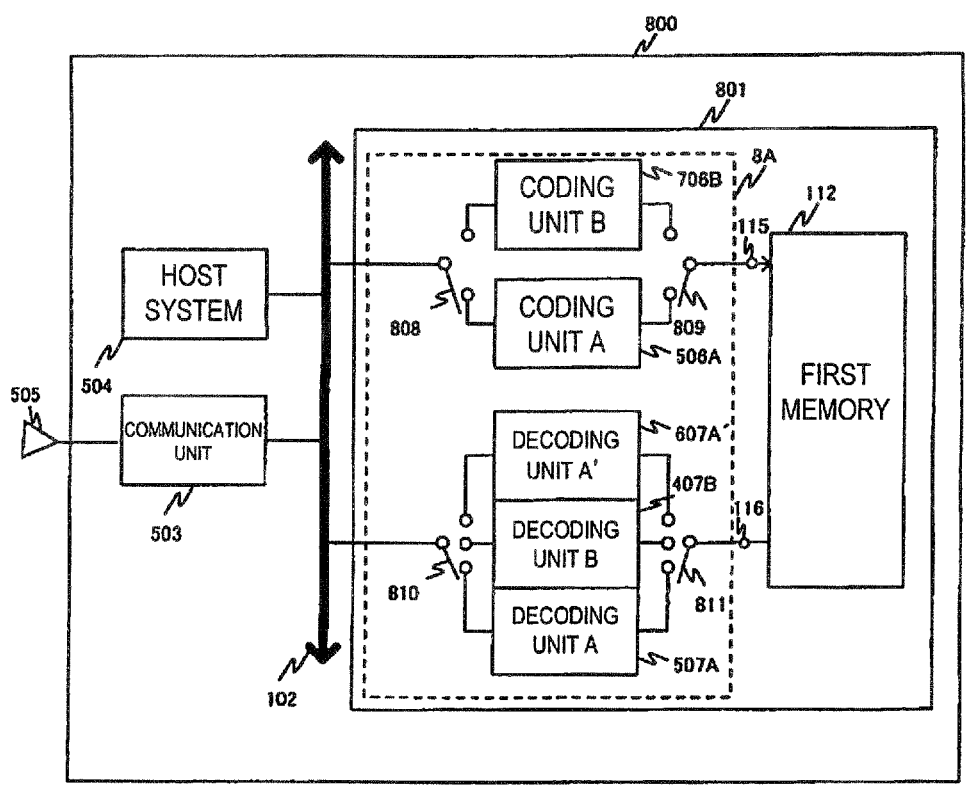
FIG. 12 is a block diagram showing a data-exchangeable communication terminal according to the fourth embodiment of the present invention.

The present embodiment has been described assuming that the communication terminal 600 is on the transmitting side and the communication terminal 700 is on the receiving side, but a single common communication terminal may be configured to both transmit and receive data. An exemplary communication device 800 capable of both transmitting and receiving data is shown in FIG. 12. The same constituents as those of the communication terminal 500 are denoted with the same reference numerals, and an explanation thereof will be omitted.

The communication terminal 800 has switches 808 to 811. The switches 808 to 811 select the connection between the first memory 112 and the internal bus 102 in response to an instruction of the communication unit 503. Specifically, in order to connect the write port 115 of the first memory 112 and the internal bus 102, the switches 808, 809 select the connection between the write port 115 and the internal bus 102 via the coding unit A 506A or the connection via the coding unit B 706B. The switches 808, 809 are connectively referred to as first switch.

When connecting the read port 116 of the first memory 112 and the internal bus 102, the switches 810, 811 select the connection between the read port 116 and the internal bus 102 via the decoding unit A 507A, the connection via the decoding unit A' 607A', or the connection via the decoding unit B407B. The switches 810, 811 are collectively referred to as second switch.

When the communication terminal 800 transmits transmission data in the normal mode, the switches 808, 809 operate to connect the write port 115 and the internal bus 102 via the coding unit A 506A. The switches 810, 811 operate to connect the read port 116 and the internal bus 102 via the decoding unit A 507A. When the communication terminal 800 transmits transmission data in the high speed mode, the switches 808, 809 operate to connect the write port 115 and the internal bus 102 via the coding unit A506A. The switch 810 and 811 connect the read port 116 with the internal bus 102 via the decoding unit A' 607A'.

When the communication terminal 800 receives reception data in the normal mode, the switches 808, 809 operate to connect the write port 115 and the internal bus 102 via the coding unit A 506A. The switches 810, 811 operate to connect the read port 116 and the internal bus 102 via the decoding unit A 507A.

When the communication terminal 800 receives reception data in the high speed mode, the switches 808, 809 operate to connect the write port 115 and the internal bus 102 via the coding unit B 706B. The switches 510, 511 operate to connect the read port 116 and the internal bus 102 via the decoding unit B 407B. Other operations are the same as those of the communication terminal 600 of FIG. 10 when the communication terminal 800 operates as the transmitting-side device and those of the communication terminal 700 of FIG. 10 when the communication terminal 800 operates as the receiving-side device.

There has been described in the first to fourth embodiments the example in which the transmitting-side communication terminal and the receiving-side communication terminal use the same coding system to perform coding and decoding in the normal mode. However, the transmitting-side communication terminal and the receiving-side communication terminal may use different coding systems to perform coding and decoding in the normal mode, respectively.

There has been described in the first to fourth embodiments the example in which the communication terminal has a host system, but a host system may not be provided. In this case, a communication terminal not including a host system may operate by being connected to a cell phone or the like comprising a host system.

The present invention is not limited to the above embodiments, and the constituents thereof may be modified without departing from the spirit of the present invention. A plurality of constituents disclosed in the above embodiments may be appropriately combined to form various inventions. For example, some constituents may be deleted from all the constituents indicated in the embodiments. Further, constituents in different embodiments may be appropriately combined.

What is claimed is:

1. A communication terminal which is a portable electronic terminal device having a first communication mode and a second communication mode, wherein the communication terminal selectively operates in either one of the first communication mode and the second communication mode, and wherein the communication terminal performs peer-to-peer communication with another communication terminal which is also a portable electronic terminal device and which operates in either the first communication mode or the second communication mode in correspondence with the communication terminal, the communication terminal comprising:

a coding unit which codes data to generate coded data;
a memory which stores the coded data;
a decoding unit which decodes the coded data to generate decoded data in the first communication mode; and
a communication unit which transmits the decoded data in the first communication mode and transmits the coded data in the second communication mode,
wherein the communication terminal transmits a communication mode confirmation signal for confirming whether or not the other communication terminal can perform communication in the second communication mode before transmitting the data, and when the communication terminal receives a signal from the other communication terminal indicating that communication is possible in the second communication mode, the communication terminal performs communication in the second communication mode,
wherein the communication terminal receives the signal from the other communication terminal indicating that communication is possible in the second communication mode, when the communication terminal determines that the coding unit in the communication terminal and another decoding unit in the other communication terminal use a same error correction coding system to perform coding or decoding, and when the communication terminal can select decoding or not decoding by the decoding unit, and when the other communication terminal can select coding or not coding by another coding unit of the other communication terminal.

2. A communication terminal which is a portable electronic terminal device having a first communication mode and a second communication mode, wherein the communication terminal selectively operates in either one of the first communication mode and the second communication mode in correspondence with another communication terminal which is also a portable electronic terminal device, and wherein the communication terminal performs peer-to-peer communication with the other communication terminal which operates in either the first communication mode or the second communication mode, the communication terminal comprising:

a communication unit which receives first coded data or first decoded data of the first coded data;
a coding unit which codes the first decoded data to generate second coded data in the first communication mode;
a memory which stores the second coded data in the first communication mode and stores the first coded data in the second communication mode; and
a decoding unit which decodes the first coded data stored in the memory,
wherein the communication terminal receives a communication mode confirmation signal from the other communication terminal for confirming whether or not the communication terminal can perform communication in the second communication mode before receiving the data, and when the communication terminal transmits a signal to the other communication terminal indicating that communication is possible in the second communication mode, communication is performed with the other communication terminal in the second communication mode,
wherein the communication terminal transmits the signal to the other communication terminal indicating that communication is possible in the second communication mode, when the communication terminal determines that another coding unit in the other communication terminal and the decoding unit in the communication terminal use a same error correction coding system to perform coding or decoding, and when the other communication terminal can select decoding or not decoding by another decoding unit in the other communication terminal, and when the communication terminal can select coding or not coding by the coding unit.

3. The communication terminal according to claim 2 further comprising a write back control unit, wherein in the second communication mode, the first coded data stored in the memory is decoded by the decoding unit to generate second decoded data, the second decoded data is coded by the coding unit to generate third coded data, and the third coded data is stored in the memory.

4. A peer-to-peer communication method for a peer-to-peer communication system including a first communication terminal which is a portable electronic terminal device having a first communication mode and a second communication mode, wherein the first communication terminal selectively operates in either one of the first communication mode and the second communication mode; and a second communication terminal which is a portable electronic terminal device having the first communication mode and the second communication mode, wherein the second communication terminal selectively operates in either one of the first communication mode and the second communication mode in correspondence with the first communication terminal, wherein the first communication terminal comprises: a first coding unit, a first memory, a first decoding unit; and a first communication unit, and wherein the second communication terminal comprises: a second communication unit, a second coding unit, a second memory, and a second decoding unit, the method comprising:

transmitting a communication mode confirmation signal from the first communication terminal for confirming whether or not the second communication terminal can perform communication in the second communication mode, before transmitting data;

determining whether or not the first coding unit in the first communication terminal and the second decoding unit in the second communication terminal use a same error correction coding system to perform coding or decoding, and determining whether or not the first communication terminal can select decoding or not decoding by the first decoding unit, and whether or not the second communication terminal can select coding or not coding by the second coding unit;

receiving a signal from the second communication terminal indicating that communication is possible in the second communication mode, when it is determined that the first coding unit in the first communication terminal and the second decoding unit in the second communication terminal use the same error correction coding system to perform coding or decoding, and when it is determined that the first communication terminal can select decoding or not decoding by the first decoding unit, and that the second communication terminal can select coding or not coding by the second coding unit;

operating the first and second communication terminals in the second communication mode when the signal from the second communication terminal indicating that the communication is possible in the second communication mode is received; and operating the first and second communication terminals in the first communication mode when the signal from the second communication terminal indicating that the communication is not possible in the second communication mode is received, wherein in the first communication mode, the first coding unit codes data to generate first coded data, the first memory stores the first coded data, the first decoding unit decodes the first coded data to generate first decoded data, the first communication unit transmits the first decoded data to the second communication terminal, the second communication unit receives the first decoded data, the second coding unit codes the first decoded data to generate second coded data, and the second memory stores the second coded data, and wherein in the second communication mode, the first communication unit transmits the first coded data without decoding by the first decoding unit, the second communication unit receives the first coded data, the second memory stores the first coded data without coding by the second coding unit, and the second decoding unit decodes the first coded data stored in the second memory.

5. The peer-to-peer communication method according to claim 4, wherein the second communication terminal further comprises a write back control unit, and wherein the method further comprises, in the second communication mode, decoding the first coded data stored in the second memory by the second decoding unit to generate second decoded data, coding the second decoded data by the second coding unit to generate third coded data, and storing the third coded data in the second memory.

* * * * *